(12) United States Patent
Chen

(10) Patent No.: US 8,479,915 B2
(45) Date of Patent: Jul. 9, 2013

(54) ADJUSTABLE PROTECTIVE COVER FOR ELECTRONIC DEVICE

(75) Inventor: Stephen Chen, Changhua (TW)

(73) Assignee: E-Lead Electronic Co., Ltd., Changhua (TW)

(*) Notice: Subject to any disclaimer, the term of this patent is extended or adjusted under 35 U.S.C. 154(b) by 266 days.

(21) Appl. No.: 13/064,279

(22) Filed: Mar. 16, 2011

(65) Prior Publication Data
US 2012/0234716 A1 Sep. 20, 2012

(51) Int. Cl.
*B65D 85/00* (2006.01)
*B65D 85/30* (2006.01)

(52) U.S. Cl.
USPC .................................. 206/320; 206/472

(58) Field of Classification Search
USPC ............. 206/320, 472, 818, 701, 473; 361/679.55–679.58; 190/103
See application file for complete search history.

(56) References Cited

U.S. PATENT DOCUMENTS

| | | | |
|---|---|---|---|
| 5,135,012 A * | 8/1992 | Kamen et al. .................. 132/294 |
| 7,100,765 B2 * | 9/2006 | Collins, IV .................. 206/308.1 |
| 7,191,926 B1 * | 3/2007 | Costantino et al. ........... 224/605 |
| 7,414,833 B2 * | 8/2008 | Kittayapong ............. 361/679.27 |
| 7,672,117 B1 * | 3/2010 | Gary et al. ................ 361/679.01 |
| 8,047,365 B1 * | 11/2011 | Lin et al. ........................ 206/320 |
| 2004/0217027 A1 * | 11/2004 | Harris et al. ................... 206/320 |
| 2006/0226040 A1 * | 10/2006 | Medina ......................... 206/320 |
| 2007/0119734 A1 * | 5/2007 | Pichahchi ..................... 206/320 |
| 2008/0302687 A1 * | 12/2008 | Sirichai et al. ................ 206/320 |
| 2009/0272662 A1 * | 11/2009 | Lin et al. ....................... 206/320 |
| 2010/0044259 A1 * | 2/2010 | Wang ............................ 206/320 |
| 2010/0110629 A1 * | 5/2010 | Dietz et al. ............... 361/679.55 |
| 2010/0149739 A1 * | 6/2010 | Mish et al. ............... 361/679.02 |
| 2010/0294683 A1 * | 11/2010 | Mish et al. ..................... 206/320 |
| 2012/0037285 A1 * | 2/2012 | Diebel et al. .................. 150/165 |
| 2012/0043234 A1 * | 2/2012 | Westrup ........................ 206/320 |
| 2012/0043247 A1 * | 2/2012 | Westrup ........................ 206/472 |

* cited by examiner

*Primary Examiner* — Steven A. Reynolds
(74) *Attorney, Agent, or Firm* — Guice Patents PLLC

(57) ABSTRACT

The present invention relates to an adjustable protective cover for electronic device that is consists of a front cover and a back cover; wherein the front cover and the back cover are connected and are capable of folding to cover and contain an electronic device. The inner surface of the back cover is a surface capable of being stuck and fixed that allows at least two independent corner covers to be fixed thereon. The independent corner cover has a base seat, whereon a fixing strip is disposed to fit with a corner of electronic device body. The independent corner cover is capable of adjusting the sticking position according to the size of electronic device in order to contain and protect electronic device bodies of different sizes.

14 Claims, 5 Drawing Sheets

ADJUSTABLE PROTECTIVE COVER FOR ELECTRONIC DEVICE

BACKGROUND OF THE INVENTION

1. Field of the Invention

The present invention relates to an adjustable protective cover for electronic device; and more particularly, to an adjustable protective cover for electronic device capable of adjusting the fixing position thereof according to the size of electronic device in order to contain and protect electronic device bodies of different sizes; and capable of being watched, stored and held easily.

2. Brief Description of the Related Art

The computer has been developing with time: from the early computer room to PC and laptop, and then to touch-controlled portable electronic device such as smart phone or tablet computer. The portable electronic device possesses touch screen technology that allows the user to select the target by clicking directly on the screen and zoom in or out the displayed content by pinch gestures. The foregoing operating method requires a closer distance between the user and the screen, and is much more convenient and user-friendly than the traditional keyboard operating method; moreover, the foregoing portable electronic device is of a simple board body structure, allowing the user to touch and operate thereon easily.

The foregoing portable electronic device is commonly favored by the users for its simple structure and elegant appearance design; however, the outer surface thereof is often scratched or stained. Hence, manufactures designed a series of protective covers 11 for electronic device made of different materials, as illustrated in FIG. 1. The protective cover 11 usually covers the back surface of the electronic device 12, and hollows out the display screen part 111 to allow operation. Since the protective covers are generally of fixed size, the single protective cover cannot commonly fit with electronic devices of different brands or models. Therefore, the problem of product stocks and materials troubles the protective cover manufacturers, and the problem of extra costs on protective covers when replacing their electronic device troubles the users.

SUMMARY OF THE INVENTION

In order to overcome the deficiencies of the prior art, a primary object of the present invention is to provide an adjustable protective cover for electronic device capable of adjusting the fixing position thereof according to the size of electronic device in order to contain electronic device bodies of different sizes; and capable of being watched, stored and held easily.

With the above object in mind, the adjustable protective cover for electronic device is consists of a front cover and a back cover; wherein the front cover and the back cover are connected and are capable of folding to cover and contain an electronic device. The inner surface of the back cover is a surface capable of being stuck and fixed that allows at least two independent corner covers to be fixed thereon. The independent corner cover has a base seat, whereon a fixing strip is disposed. The fixing strip has two end parts attached to the independent corner cover, forming a ring shape to fit with a corner of electronic device body. The back surface of the independent corner cover is a surface capable of being stuck and fixed, and thereby capable of adjusting the sticking position according to the size of electronic device in order to contain and protect electronic device bodies of different sizes.

The inner surface of the back cover is a surface capable of being stuck and fixed, and is of flannelette material that can work with Velcro; and the back surface of the independent corner cover has a Velcro piece.

The inner surface of the back cover is a surface capable of being stuck and fixed, and has a Velcro piece disposed thereon; and the back surface of the independent corner cover is of flannelette material that can work with Velcro.

The front cover is disposed of a first fixing component on the back surface thereof.

The inner surface of the back cover is disposed of a second fixing component at a position corresponding to the first fixing component.

The first fixing component and the second fixing component are magnetic components that can be magnetically connected together. The first fixing component and the second fixing component can further be hidden inside the front cover and the back cover respectively.

The first fixing component and the second fixing component are buckling components that can be buckled and joined to each other.

The back cover is further disposed of a fastening belt at the lateral side thereof; the fastening belt provides a third fixing component. The third fixing component is a magnetic component or a buckling component that can be magnetically connected to or buckled and joined to the first fixing component when the front cover and the back cover fold to cover the electronic device body.

The adjustable protective cover for electronic device of the present invention comprises four independent corner covers, each fits with the four corners of the electronic device body respectively.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
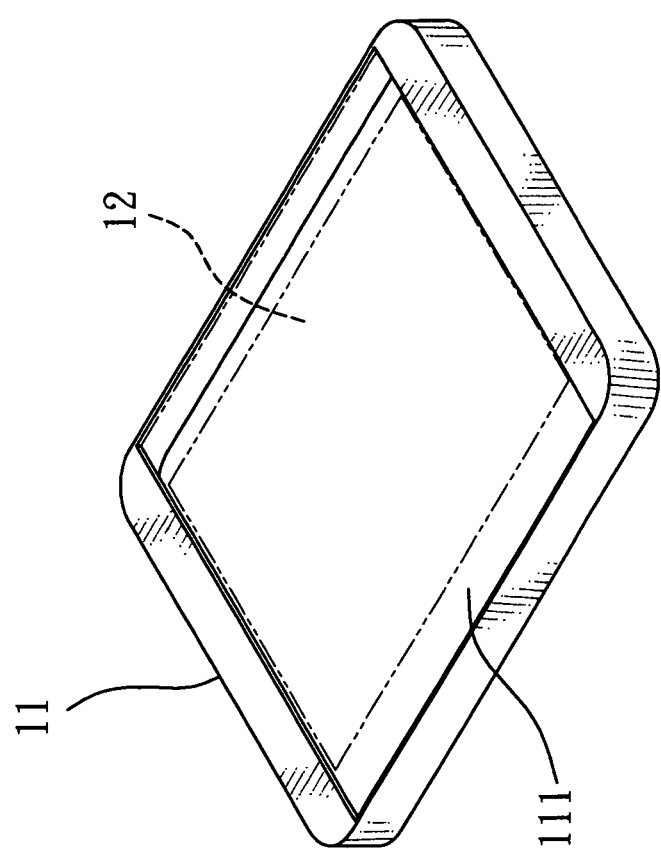
FIG. 1 is a schematic representation of a protective cover for electronic device according to prior art.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 2:
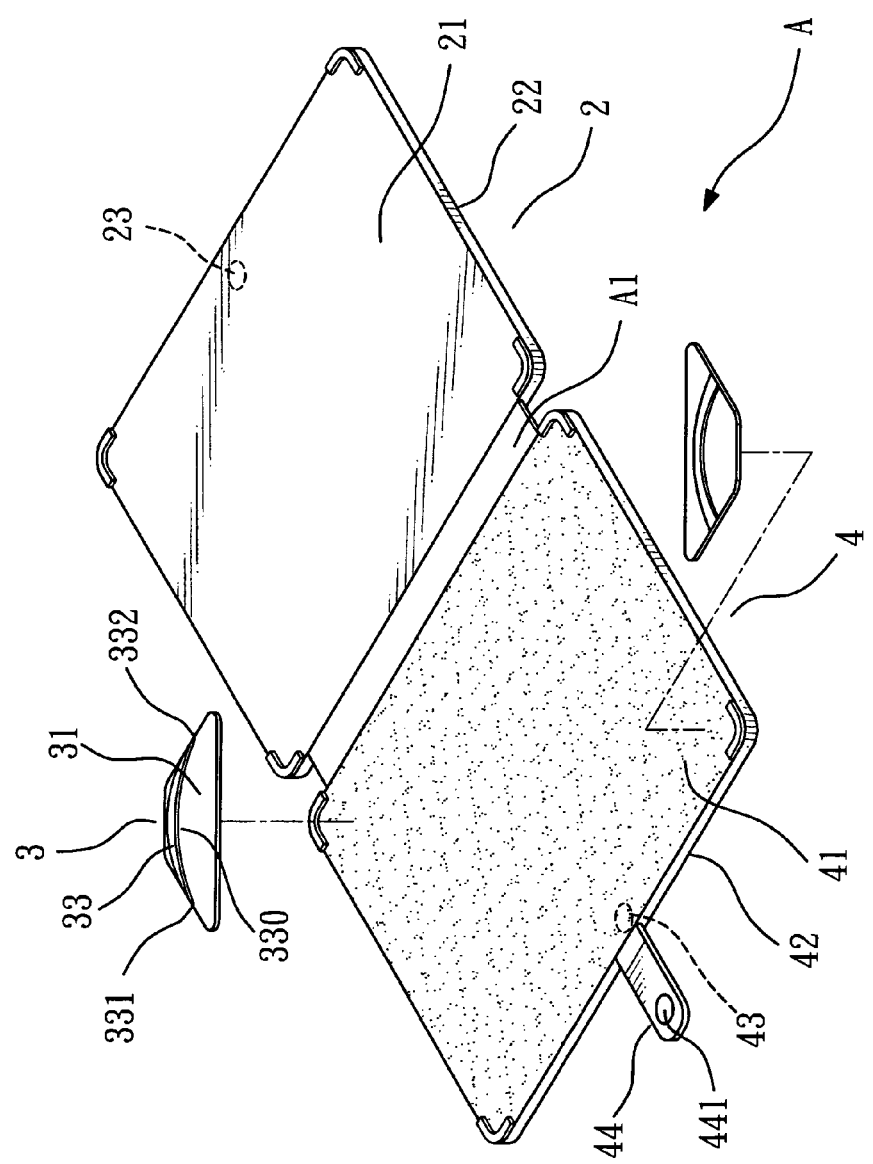
FIG. 2 is an exploded perspective view according to the present invention.
Figure 4:
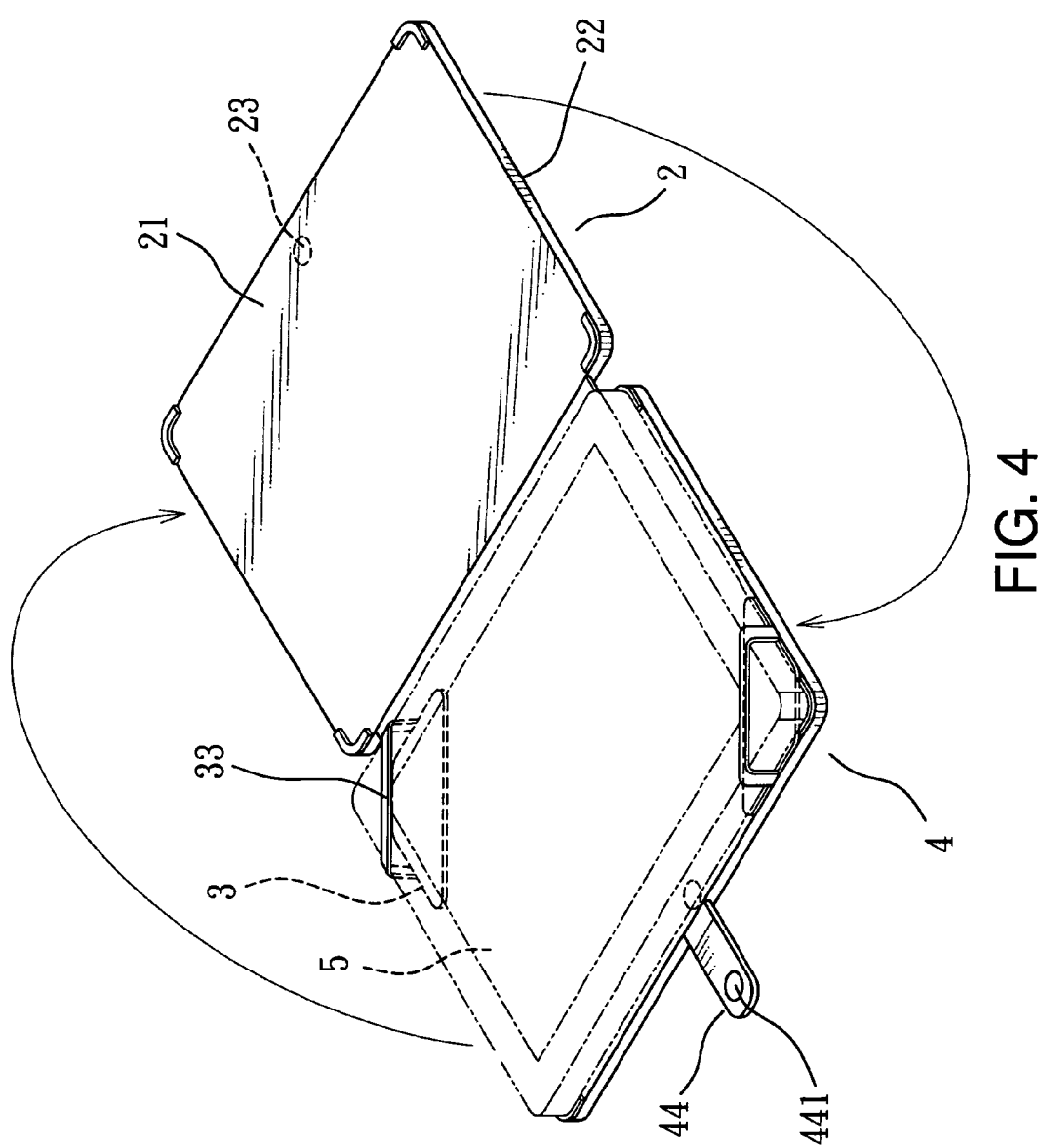
FIG. 4 is a schematic representation of an embodiment according to the present invention.

With reference to FIG. 2, the exploded perspective view according to the present invention; wherein an adjustable protective cover A for electronic device is consists of a front cover 2 and a back cover 4, and the front cover 2 and the back cover 4 are connected by a connecting part A1 and are capable of folding to cover and contain an electronic device 5 within the space between an inner surface 21 of the front cover 2 and an inner surface 41 of the back cover 4, as illustrated in FIG. 4. The connecting part A1 is a turning part for the front cover 2 and the back cover 4 to fold or open. At least two independent corner covers 3 are stuck and fixed to the inner surface 41 of the back cover 4

The front cover 2 is disposed of a first fixing component 23 on the back surface 22 thereof.

The inner surface 41 of the back cover 4 is a surface capable of being stuck and fixed, and thereby allowing the independent corner covers 3 to be correspondingly fixed thereon. The back surface 42 of the back cover 4 is disposed of a second fixing component 43 at a position corresponding to the first fixing component 23; wherein the second fixing component 43 and the first fixing component 23 can be joined together.

The independent corner cover 3 has a base seat 31, whereon a fixing strip 33 is disposed. The fixing strip 33 has two end parts 331, 332 attached to two ends of the independent corner cover 3, forming a ring-shaped space 330 to fit with a corner of electronic device 5.

The first fixing component 23 and the second fixing component 43 are magnetic components that can be magnetically connected together. The first fixing component 23 and the second fixing component 43 can further be hidden inside the front cover 2 and the back cover 4 respectively.

The first fixing component 23 and the second fixing component 43 are buckling components that can be buckled and joined to each other.

Figure 3:
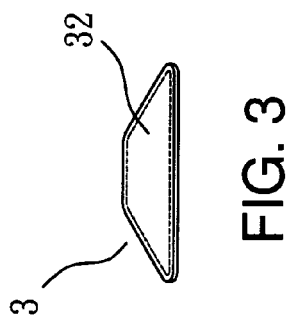
FIG. 3 is a perspective view of the independent corner cover according to the present invention.

The inner surface 41 of the back cover 4 is a surface capable of being stuck and fixed, and is of flannelette material that can work with Velcro; and the back surface 32 of the independent corner cover 3 has a Velcro piece, as illustrated in FIG. 3. This design allows the independent corner cover 3 to adjust the sticking position thereof according to the size of electronic device 5 in order to contain and protect electronic device 5 of different sizes, as shown in FIG. 7.

The inner surface 41 of the back cover 4 is a surface capable of being stuck and fixed, and has a Velcro piece disposed thereon; and the back surface 32 of the independent corner cover 3 is of flannelette material that can work with Velcro. This design allows the independent corner cover 3 to adjust the sticking position thereof according to the size of the electronic device 5 in order to contain and protect the electronic device 5 of different sizes.

Figure 5:
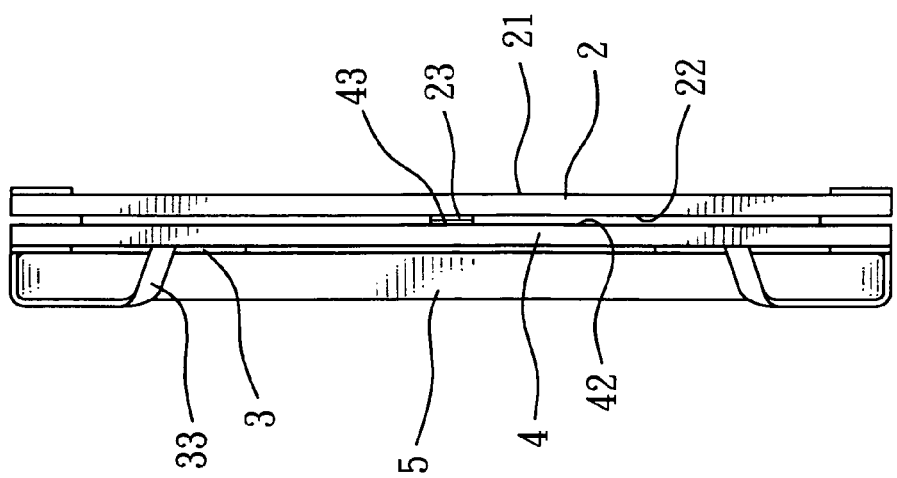
FIG. 5 is a first sectional view of the operation according to the present invention.
Figure 7:
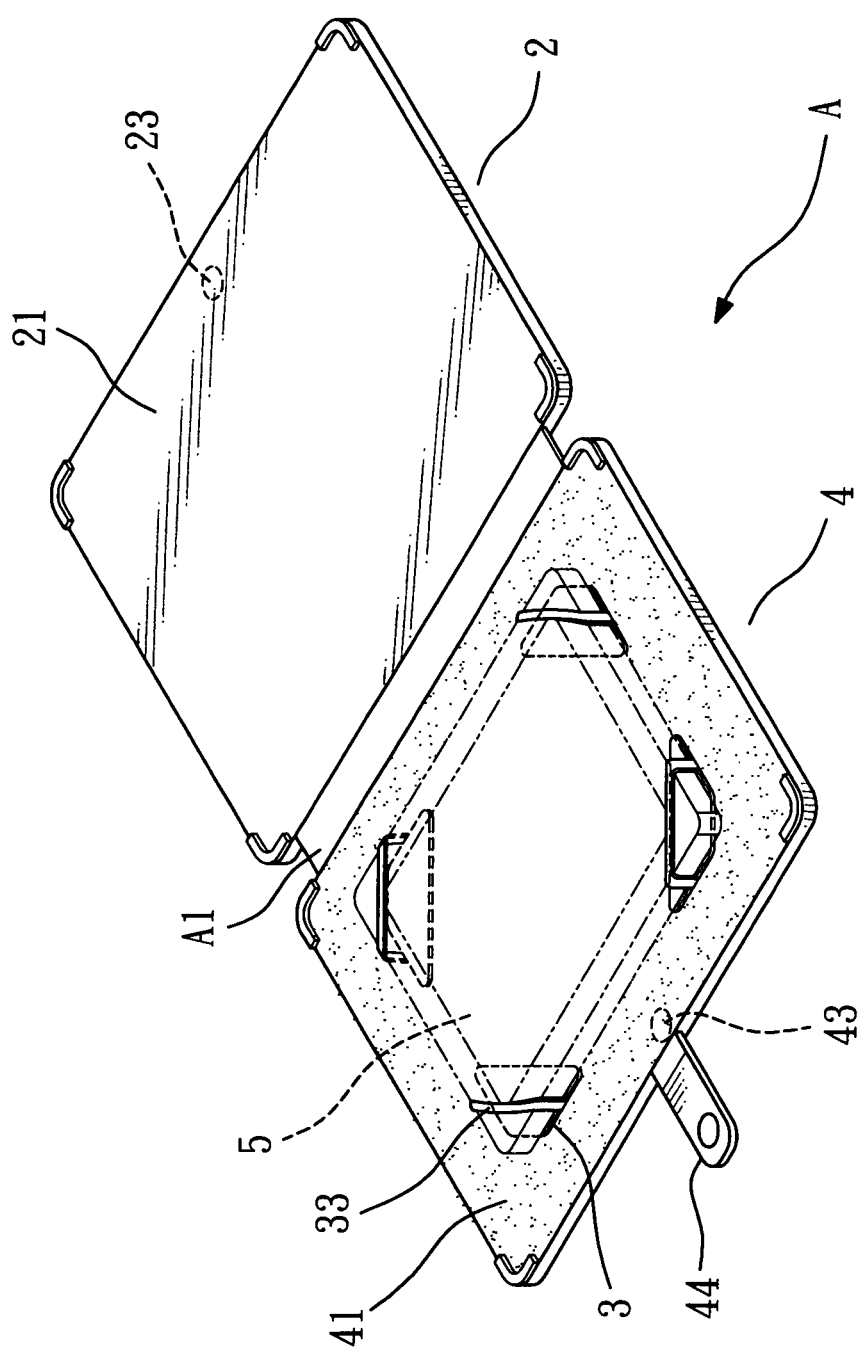
FIG. 7 is a schematic representation of another embodiment according to the present invention.

With reference to FIGS. 2, 4 and 5, to install the adjustable protective cover A onto the electronic device 5, stick and join the independent corner cover 3 to a corresponding position on the inner surface 41 of the back cover 4 according to the size of the electronic device 5; preferably matching four independent corner covers 3 to the four corners of the electronic device 5 thereof, as illustrated in FIG. 7. Fit the ring-shaped space 330 of the fixing strip 33 to the electronic device 5.

When in need of using the electronic device 5, flip open the front cover 2 and turn it 360 degrees to allow contact of the back surface 22 of the front cover 2 and the back surface 42 of the back cover 4; whereby the first fixing component 23 and the second fixing component 43 are magnetically connected to or buckled and joined to each other correspondingly.

Figure 6:
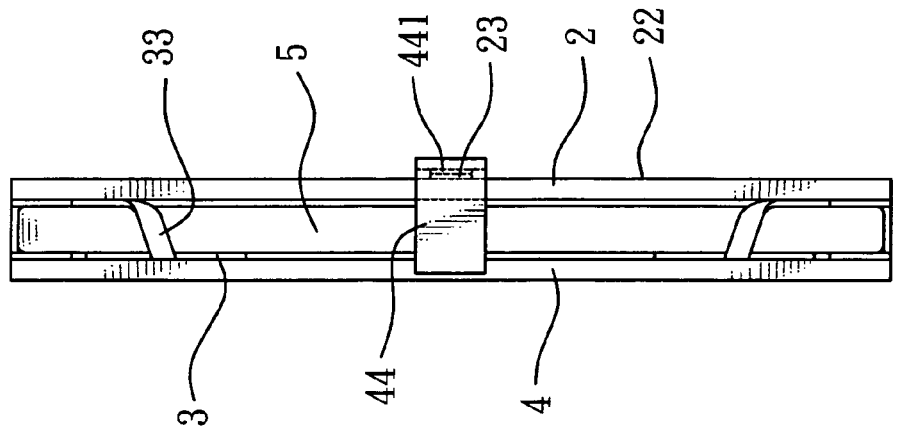
FIG. 6 is a second sectional view of the operation according to the present invention.

Further, the back cover 4 is further disposed of a fastening belt 44 at one lateral side thereof; the fastening belt 44 provides a third fixing component 441. As shown in FIG. 6, the third fixing component 441 is a magnetic component or a buckling component that can be magnetically connected to or buckled and joined to the first fixing component 23 when the electronic device 5 is not in use and hence the front cover 2 and the back cover 4 are folded together to cover it.

While the invention has been described with reference to a preferred embodiment thereof, it is to be understood that modifications or variations may be easily made without departing from the spirit of this invention, which is defined in the appended claims.

I claim:

1. An adjustable protective cover for electronic device comprising:
   a front cover connected to a back cover, wherein the front cover and the back cover are capable of folding to cover and contain an electronic device;
   the back cover having an inner surface, wherein any portion of the inner surface of the back cover is capable of being stuck or fixed to another element; and
   at least two independent corner covers fixed to the inner surface of the back cover according to size of the electronic device; each independent corner cover has a base seat providing a fixing strip, and the fixing strip has two end parts attached to two sides of the independent corner cover, forming a ring-shaped space to fit with a corner of electronic device body, allowing the adjustable protective cover for electronic device to contain the electronic device of different sizes and protect display screen thereof;
   wherein the inner surface of the back cover is a flannelette material that is capable of connecting with a hook and loop fastener; and the back surface of each independent corner cover has a hook and loop fastener piece that is selectively connectable to the flannelette material.

2. The adjustable protective cover for electronic device as defined in claim 1, wherein the front cover is disposed of a first fixing component on a back surface thereof, the back cover is disposed of a second fixing component on a back surface thereof; and the first fixing component and the second fixing component are magnetic components.

3. The adjustable protective cover for electronic device as defined in claim 1, wherein the front cover has a first fixing component located therein, the back cover has a second fixing component located therein; and the first fixing component and the second fixing component are magnetic components.

4. The adjustable protective cover for electronic device as defined in claim 1, wherein the front cover is disposed of a first fixing component on a back surface thereof, the back cover is disposed of a second fixing component on a back surface thereof; and the first fixing component and the second fixing component are buckling components.

5. The adjustable protective cover for electronic device as defined in claim 1, wherein the back cover is further disposed of a fastening belt at one lateral side thereof; the fastening belt provides a third fixing component that is a magnetic component.

6. The adjustable protective cover for electronic device as defined in claim 1, wherein the back cover is further disposed of a fastening belt at one lateral side thereof; the fastening belt provides a third fixing component that is a buckling component.

7. The adjustable protective cover for electronic device as defined in claim 1, comprising four independent corner covers, each fits with four corners of the electronic device body respectively.

8. An adjustable protective cover for electronic device comprising:
   a front cover connected to a back cover, wherein the front cover and the back cover are capable of folding to cover and contain an electronic device;

the back cover having an inner surface, wherein any portion of the inner surface of the back cover is capable of being stuck or fixed to another element; and at least two independent corner covers fixed to the inner surface of the back cover according to size of the electronic device; each independent corner cover has a base seat providing a fixing strip, and the fixing strip has two end parts attached to two sides of the independent corner cover, forming a ring-shaped space to fit with a corner of electronic device body, allowing the adjustable protective cover for electronic device to contain the electronic device of different sizes and protect display screen thereof;

wherein the inner surface of the back cover has a hook and loop fastener piece located thereon; and the back surface of each independent corner cover is a flannelette material that is selectively connectable to the hook and loop fastener piece.

9. The adjustable protective cover for electronic device as defined in claim 8, wherein the front cover is disposed of a first fixing component on a back surface thereof, the back cover is disposed of a second fixing component on a back surface thereof; and the first fixing component and the second fixing component are magnetic components.

10. The adjustable protective cover for electronic device as defined in claim 8, wherein the front cover has a first fixing component located therein, the back cover has a second fixing component located therein; and the first fixing component and the second fixing component are magnetic components.

11. The adjustable protective cover for electronic device as defined in claim 8, wherein the front cover is disposed of a first fixing component on a back surface thereof, the back cover is disposed of a second fixing component on a back surface thereof; and the first fixing component and the second fixing component are buckling components.

12. The adjustable protective cover for electronic device as defined in claim 8, wherein the back cover is further disposed of a fastening belt at one lateral side thereof; the fastening belt provides a third fixing component that is a magnetic component.

13. The adjustable protective cover for electronic device as defined in claim 8, wherein the back cover is further disposed of a fastening belt at one lateral side thereof; the fastening belt provides a third fixing component that is a buckling component.

14. The adjustable protective cover for electronic device as defined in claim 8, comprising four independent corner covers, each fits with four corners of the electronic device body respectively.

* * * * *